UNITED STATES PATENT OFFICE.

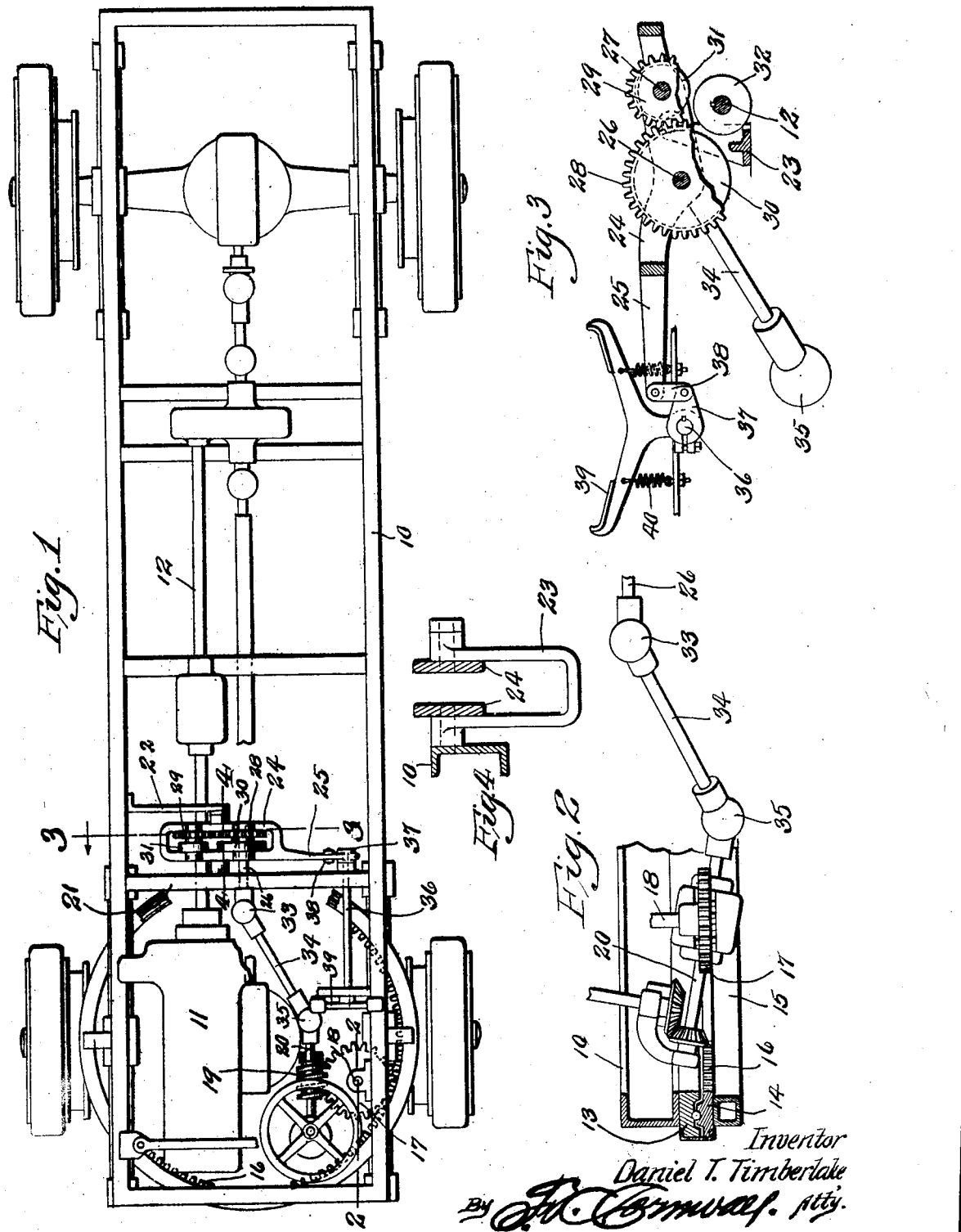

DANIEL T. TIMBERLAKE, OF ST. LOUIS, MISSOURI, ASSIGNOR TO UNIVERSAL MOTOR TRUCK AND TRACTION ENGINE COMPANY, OF ST. JAMES, MISSOURI, A CORPORATION OF MISSOURI.

POWER-DRIVEN TRUCK STEERING-GEAR.

1,354,148.  Specification of Letters Patent.  Patented Sept. 28, 1920.

Application filed December 16, 1918. Serial No. 267,008.

*To all whom it may concern:*

Be it known that I, DANIEL T. TIMBERLAKE, a citizen of the United States, residing at St. Louis, Missouri, have invented a certain new and useful Improvement in Power-Driven Truck Steering-Gears, of which the following is a full, clear, and exact description, such as will enable others skilled in the art to which it appertains to make and use the same, reference being had to the accompanying drawings, forming part of this specification.

My invention relates generally to motor trucks and more particularly to the types of trucks disclosed in my copending patent applications, Serial No. 153,307 filed March 8th, 1917, and Serial No. 259,743, filed October 26th, 1918.

The principal object of my present invention is to generally improve upon and simplify the constructions disclosed in the applications aforesaid and to provide a relatively simple, easily controlled, and efficient power operated steering mechanism for motor driven trucks.

With the foregoing and other objects in view, my invention consists in certain novel features of construction and arrangement of parts, hereinafter more fully described and claimed, and illustrated in the accompanying drawings, in which—

Figure 1 is a plan view of a motor truck showing my improved power driven steering gear applied thereto.

Fig. 2 is an enlarged detail section taken approximately on the line 2—2 of Fig. 1.

Fig. 3 is an enlarged cross section taken approximately on the line 3—3 of Fig. 1.

Fig. 4 is an enlarged detail section taken approximately on the line 4—4 of Fig. 1.

Referring by numerals to the accompanying drawings which illustrate a practical embodiment of my invention, 10 designates the main frame of a motor truck, the same being supported upon front and rear wheels in a manner well known in the art and suitably supported upon the forward portion of this frame is a motor 11, preferably a multi-cylinder internal combustion engine, the shaft of which extends rearwardly through the main frame and is suitably connected to the truck driving gear.

Secured in any suitable manner to the underside of the forward portion of frame 10 is a bearing ring 13 and positioned immediately beneath this fixed bearing ring is a revolving ring 14. Secured in any suitable manner to the underside of this revolving ring is a frame 15 which carries the front axle and wheels. Suitable anti-friction bearings are interposed between the rings 13 and 14 and a portion of the inner face of the revoluble ring 14 is toothed in order to form a segmental rack 16, the length of which is slightly greater than half the circumference of said ring. Meshing with the teeth of this rack are the teeth of a horizontally disposed pinion 17, the same being carried by a short vertically disposed shaft 18, which is journaled in suitable bearings on the main frame 10. The teeth of pinion 17 engage a worm 19, the latter being carried by a shaft 20 that is journaled for rotation in suitable bearings. A transom or cross piece 21 which forms a part of the truck frame is located a short distance to the rear of the front rail of said frame and secured in any suitable manner to this transom and to a brace or bracket 22 which occupies a position parallel with said transom are the upper ends of a U-shaped frame 23. Mounted for swinging movement upon a horizontal axis between the upper ends of this frame 23 is a horizontally disposed frame 24, the same being provided at one end with a laterally extending arm 25. Journaled for rotation in suitable bearings formed on the frame 24 are short shafts 26 and 27, and fixed thereupon are pinions 28 and 29, respectively, said pinions being meshed with each other.

Fixed on shaft 26 is a friction disk or wheel 30, and fixed on shaft 27 is a friction disk or wheel 31. Under normal conditions these friction disks or wheels do not contact with each other, but as the frame 24 is rocked upon its bearings in frame 23, the peripheries of said disks are adapted to alternately contact with a friction disk 32, the latter being carried by the motor shaft 12.

The forward end of shaft 26 is connected by a universal joint 33 with the rear end of a short forwardly projecting shaft 34 and the forward end of the latter is connected by a universal joint 35 with the rear end of shaft 20.

Journaled in suitable bearings on the main frame 10 and near the lefthand side thereof, is a longitudinally disposed shaft 36, the rear end of which carries a short crank arm 37, the same being connected to arm 25 by a link 38. The forward end of shaft 36 carries a substantially Y-shaped pedal 39, the same being normally maintained in a neutral position by means of retractile springs 40 which are connected to the arms of said pedal and to a part of the frame or flooring of the truck.

The normal position of the frame 24 and parts carried thereby and the neutral position of foot lever 39 are illustrated in Fig. 3 and when so positioned, the friction disks 30 and 31 are out of contact with friction disk 32.

To shift the front wheels so as to steer the vehicle toward the righthand, the operator with the foot presses down on the righthand arm of pedal 39, thereby rocking shaft 36 and through crank arm 37 and link 38, rocking frame 24 upon its horizontal fulcrum in frame 23.

This movement brings the periphery of disk 30 into frictional engagement with the periphery of disk 32 with the result that the rotary motion of the engine shaft 12 is transmitted to shaft 36. From this shaft, the rotary motion is transmitted through shaft 24 to shaft 20 carrying worm 19 and as said worm is rotated, motion is transmitted through pinion 17 to the revoluble ring 14, which latter is provided with rack teeth 16.

Obviously, this ring 14 is revolved beneath fixed ring 13 and as frame 15, which is secured to ring 14, carries the front axle, the latter will be swung so as to shift the front wheels and cause the vehicle to turn toward the righthand. As soon as the pressure upon the pedal 39 is relieved, the springs 40 will act to return same to its normal or neutral position.

To shift the front axle and wheels so as to cause the vehicle to turn toward the lefthand, pressure is applied to the lefthand end of pedal 39 and through rock shaft 36, crank arm 37 and link 38, frame 24 will be rocked so as to bring the periphery of friction disk 31 into engagement with friction disk 32 and the rotary motion transmitted from engine shaft 12 to shaft 27 will be transmitted through pinions 28 and 29 to shaft 26, and from thence through shaft 34, shaft 20, worm 19 and pinion 17 to ring 14 on which the segmental rack is formed and which carries the axle supporting frame 15.

By virtue of the pinions 28 and 29 the motion transmitted from the shaft 12 through the connections just mentioned is such as to cause the front axle and wheels to swing into position to steer the vehicle toward the lefthand.

A power steering gear of my improved construction is comparatively simple, readily controlled, is very effective in use and can be readily utilized with the type of manually operated steering gear disclosed in my application Serial No. 259,743, filed October 26, 1918.

It will be readily understood that minor changes in the form, size and construction of the various parts of my improved steering gear may be made and substituted for those herein shown and described, without departing from the spirit of my invention, the scope of which is set forth in the appended claims.

What I claim is:

1. In a motor truck, a main frame, a driving motor mounted thereon, a secondary frame arranged for revoluble movement beneath the front portion of the main frame, a front axle and wheels carried by said secondary frame, a rocking frame, connections from said rocking frame to the secondary frame, and connections from the rocking frame to the motor, and means for imparting movement to the rocking frame whereby the secondary frame is connected to the motor and revolved.

2. In a motor truck, a main frame, a motor carried thereby, a secondary frame arranged for revoluble movement beneath the front portion of the main frame, a front axle and wheels carried by said secondary frame, a segmental rack on said secondary frame, a pinion meshing with said rack, a rocking frame provided with a friction disk, drive connections from the shaft of the motor to said disk, transmission means between said disk and pinion and means for actuating said rocking frame whereby the friction disk will cause movement to be imparted to the aforesaid pinion.

3. In a motor truck, a main frame, a driving motor mounted thereupon, a secondary frame arranged for revoluble movement beneath the front portion of the main frame, a front axle and wheels carried by said secondary frame, a segmental rack on said secondary frame, a pinion meshing with said rack, a worm for driving said pinion, a friction disk on the shaft of the motor, a rocking frame, friction disks journaled therein and adapted, when the rocking frame is actuated, to contact with the disk on the motor shaft, and connections from one of the friction disks in the rocking frame to the worm.

4. In a motor truck, a main frame, a driving motor mounted thereupon, a secondary frame arranged for revoluble movement beneath the front portion of the main frame, a front axle and wheels carried by said secondary frame, a segmental rack on said secondary frame, a pinion meshing with said rack, a worm for driving said pinion, a friction disk on the shaft of the motor, a rocking frame, friction disks journaled therein and adapted when the rocking frame is actuated to contact with the disk on the motor shaft, connections from one of the friction disks in the rocking frame to the worm, and means for actuating said rocking frame.

5. In a motor truck, a main frame, a driving motor mounted thereupon, a secondary frame arranged for revoluble movement beneath the front portion of the main frame, a front axle and wheels carried by said secondary frame, a segmental rack on said secondary frame, a pinion meshing with said rack, transmission means between said pinion and motor, a rocking frame for connecting said transmission means to the motor and a pedally operated means for actuating said rocking frame.

6. In a motor truck, a main frame, a driving motor mounted thereupon, a secondary frame arranged for revoluble movement beneath the front portion of the main frame, a front axle and wheels carried by said secondary frame, a segmental rack on said secondary frame, a pinion meshing with said rack, a worm for driving said pinion, a shaft connected to said worm, a friction disk on a part of said shaft, a rocking frame carrying said friction disk, a friction disk on the shaft of the motor, and means for actuating said frame to move the friction disk carried thereby into engagement with the friction disk on the motor shaft.

In testimony whereof I hereunto affix my signature, this 14th day of December, 1918.

DANIEL T. TIMBERLAKE.